(12) United States Patent
Dhaka

(10) Patent No.: US 12,425,872 B2
(45) Date of Patent: Sep. 23, 2025

(54) METHOD AND APPARATUS FOR AUTO PRIORITIZATION OF PLANNED NETWORK SITES

(71) Applicant: Rakuten Symphony, Inc., Tokyo (JP)

(72) Inventor: Prithvi Raj Dhaka, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/923,737

(22) PCT Filed: Sep. 7, 2022

(86) PCT No.: PCT/US2022/042704
§ 371 (c)(1),
(2) Date: Nov. 7, 2022

(87) PCT Pub. No.: WO2024/054202
PCT Pub. Date: Mar. 14, 2024

(65) Prior Publication Data
US 2024/0224061 A1     Jul. 4, 2024

(51) Int. Cl.
*H04W 16/18*     (2009.01)
*H04L 41/14*     (2022.01)

(52) U.S. Cl.
CPC ........... *H04W 16/18* (2013.01); *H04L 41/145* (2013.01)

(58) Field of Classification Search
CPC .............................. H04W 16/18; H04L 41/145
USPC ........................................................ 455/418
See application file for complete search history.

(56) References Cited

PUBLICATIONS

International Search Report dated Jan. 6, 2023 in Application No. PCT/US2022/042704.
Written Opinion of the International Searching Authority dated Jan. 6, 2023 in Application No. PCT/US2022/042704.

*Primary Examiner* — Michael R Neff
(74) *Attorney, Agent, or Firm* — Sughrue Mion, PLLC

(57) ABSTRACT

A method for planning network sites includes receiving a dataset of a plurality of planned network sites. The method further includes executing a coverage availability microservice to determine coverage availability for each planned network site in the plurality of planned network sites. The method further includes executing one or more microservices to determine geographic conditions for each planned network site in the plurality of network sites. The method further includes executing a priority microservice to assign one or more priority levels to each planned network site of the plurality of planned network sites based on at least the determined coverage availability for each planned network site and the determined geographic conditions for each planned network site. The method further includes executing a report generating microservice to generate a report for each planned network site of the plurality of network sites.

20 Claims, 7 Drawing Sheets

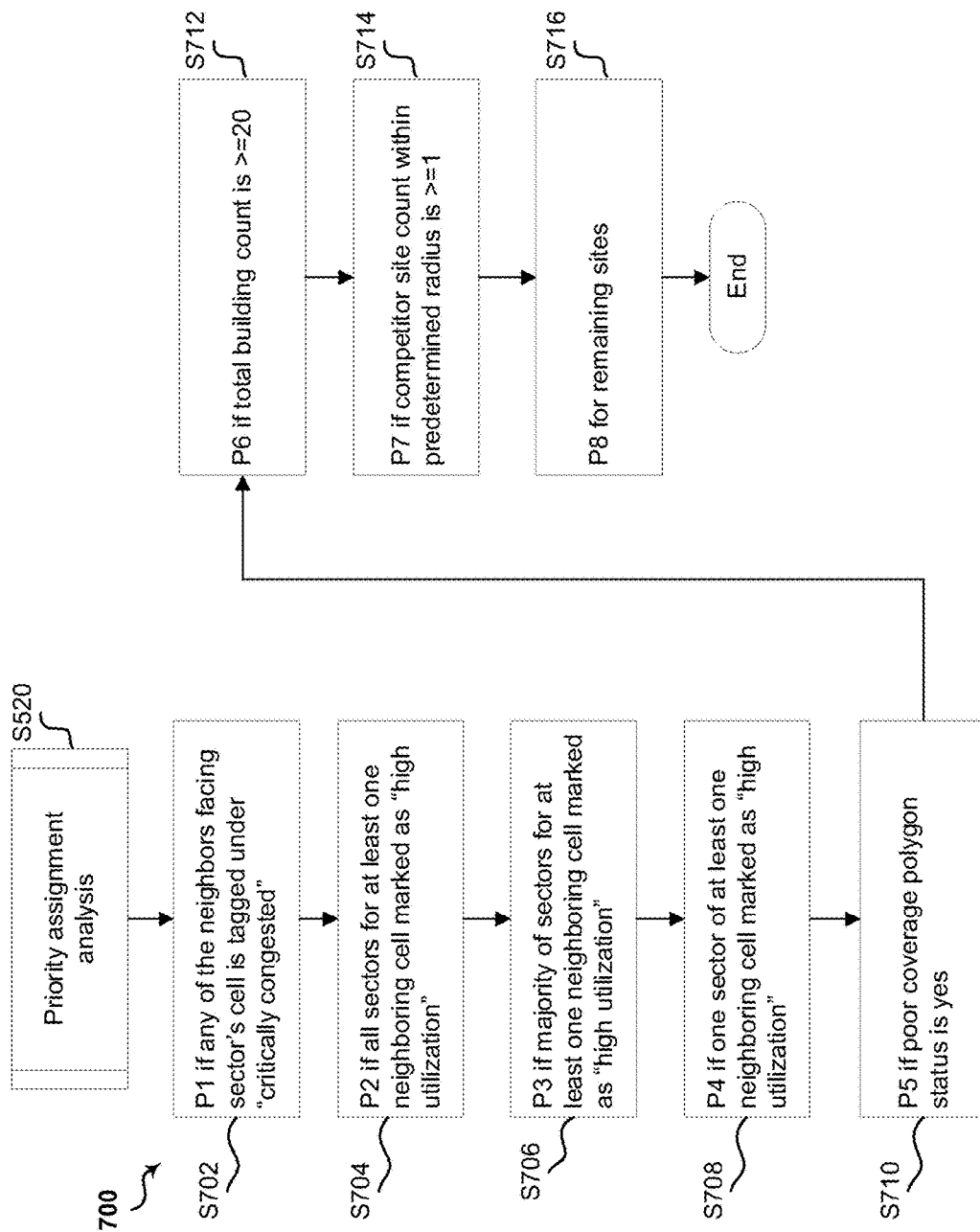

METHOD AND APPARATUS FOR AUTO PRIORITIZATION OF PLANNED NETWORK SITES

CROSS REFERENCE TO RELATED APPLICATIONS

This application is a National Stage of International Application No. PCT/US2022/042704 filed Sep. 7, 2022.

TECHNICAL FIELD

The present disclosure relates generally to communication systems, and more particularly to methods and apparatuses for auto prioritization of planned network sites.

BACKGROUND

Network site deployment is a critical process for maintaining network performance. Particularly, deploying a network site at an optimal location at an optimal timing may significantly improve network performance, thereby resolving customer complaints. However, currently there is no automated process for planning & network site deployment. Particularly, for smaller regions within a country, there is no centralized planning as well as a process of prioritizing sites. Therefore, there is a need to determine which site to develop ahead of others to resolve customer complaints via improved network performance and generate more revenue within an existing vicinity. Improves are presented herein.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for auto prioritization of planned network sites are disclosed by the present disclosure.

According to an exemplary embodiment, a method performed in a processor for planning network sites includes receiving a dataset of a plurality of planned network sites. The method further includes executing a coverage availability microservice to determine coverage availability for each planned network site in the plurality of planned network sites. The method further includes executing one or more microservices to determine geographic conditions for each planned network site in the plurality of network sites. The method further includes executing a priority microservice to assign one or more priority levels to each planned network site of the plurality of planned network sites based on at least the determined coverage availability for each planned network site and the determined geographic conditions for each planned network site. The method further includes executing a report generating microservice to generate a report for each planned network site of the plurality of network sites, the report including at least the determined coverage availability, the determined geographic conditions, and the assigned one or more priority levels for each planned network site.

According to an exemplary embodiment, a device for planning network sites includes at least one memory configured to store computer program code, and at least one processor configured to access said at least one memory and operate as instructed by said computer program code. The program code includes receiving code configured to cause at least one of said at least one processor to receive a dataset of a plurality of planned network sites. The program code further includes first executing code configured to cause at least one of said at least one processor to execute a coverage availability microservice to determine coverage availability for each planned network site in the plurality of planned network sites. The program code further includes second executing code configured to cause at least one of said at least one processor to execute one or more microservices to determine geographic conditions for each planned network site in the plurality of network sites. The program code further includes third executing code configured to cause at least one of said at least one processor to execute a priority microservice to assign one or more priority levels to each planned network site of the plurality of planned network sites based on at least the determined coverage availability for each planned network site and the determined geographic conditions for each planned network site. The program code further includes fourth executing code configured to cause at least one of said at least one processor to execute a report generating microservice to generate a report for each planned network site of the plurality of network sites, the report including at least the determined coverage availability, the determined geographic conditions, and the assigned one or more priority levels for each planned network site.

According to an exemplary embodiment, a non-transitory computer readable medium having instructions stored therein, which when executed by a processor cause the processor to execute a method for planning network sites. The method includes receiving a dataset of a plurality of planned network sites. The method further includes executing a coverage availability microservice to determine coverage availability for each planned network site in the plurality of planned network sites. The method further includes executing one or more microservices to determine geographic conditions for each planned network site in the plurality of network sites. The method further includes executing a priority microservice to assign one or more priority levels to each planned network site of the plurality of planned network sites based on at least the determined coverage availability for each planned network site and the determined geographic conditions for each planned network site. The method further includes executing a report generating microservice to generate a report for each planned network site of the plurality of network sites, the report including at least the determined coverage availability, the determined geographic conditions, and the assigned one or more priority levels for each planned network site.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIG. 7 illustrates a flow chart of an embodiment of a process for assigning priority values to planned network sites, in accordance with various embodiments of the present disclosure.

DETAILED DESCRIPTION

Figure 1:
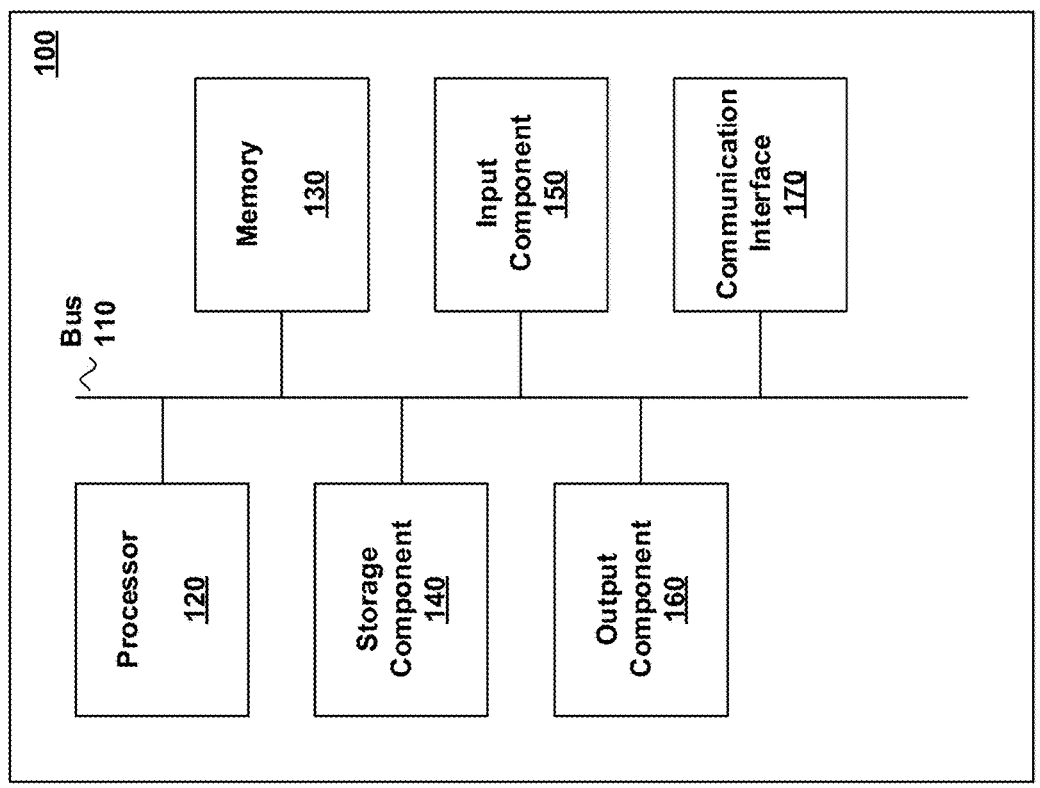
FIG. 1 is a diagram of an example processing device in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to automated prioritization of planned network sites enabling engineering teams to know which site to be radiated/deployed first to resolve the problems of a highly utilized cell/site and customer complaints. The embodiments of the present disclosure provide the significantly advantageous features of prioritizing sites that improve or optimize network performance while generating more revenue from an existing vicinity, as well as reduce a churn rate (e.g., customer turnover) in areas where customer complaints are high due to network issues. The embodiments of the present disclosure speed up network site deployment. For example, when there are thousands of planned network sites, the embodiments of the present disclosure may indicate which sites to prioritize.

FIG. 1 is diagram of an example device for implementing the embodiments of the present disclosure. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, and the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the UE 210 and/or server 260 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
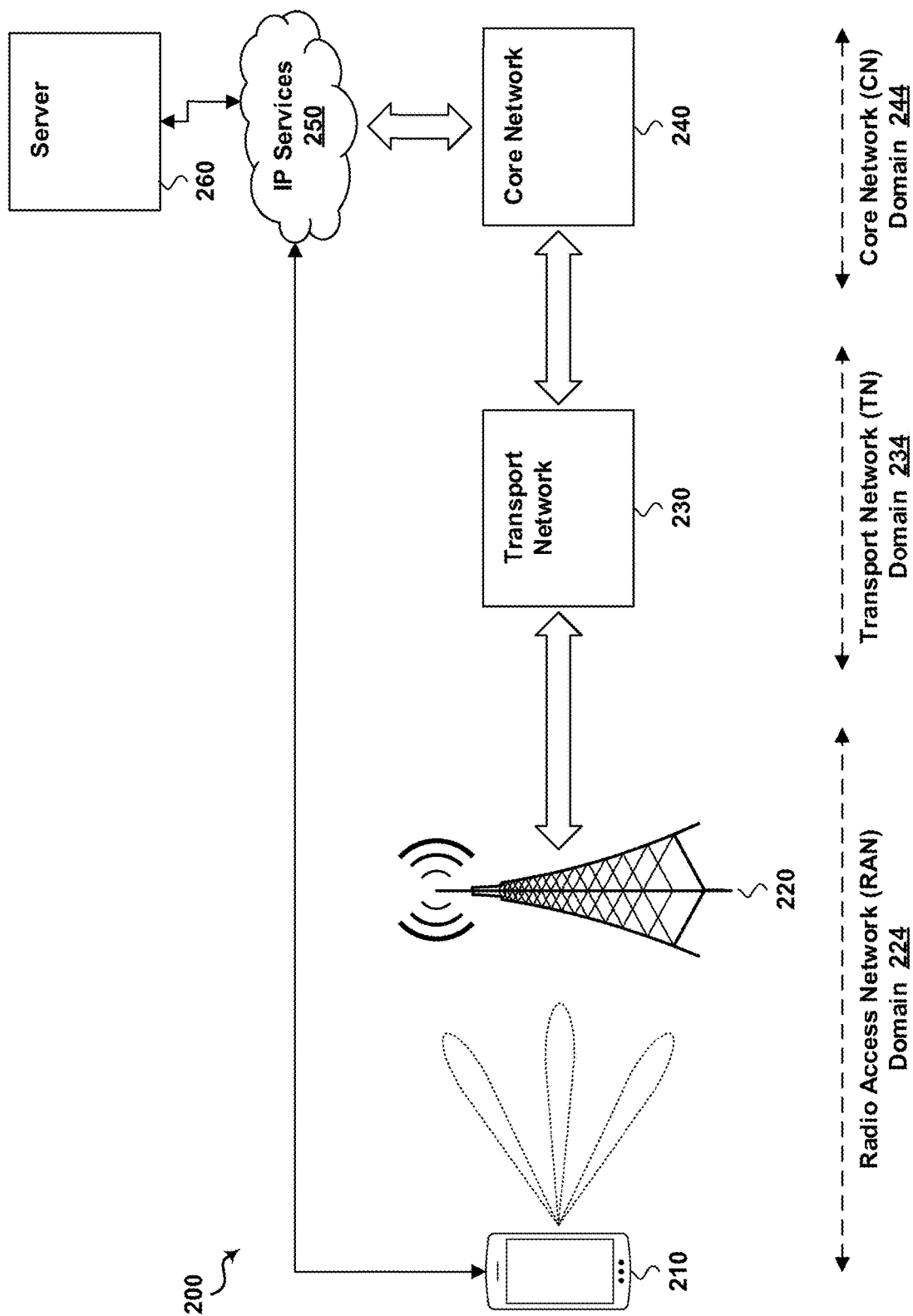
FIG. 2 is a schematic diagram of an example communication system, in accordance with various embodiments of the present disclosure.

FIG. 2 is a diagram illustrating an example of a communication system, according to various embodiments of the present disclosure. The communication system 200 may include one or more user equipment (UE) 210, one or more base stations 220, at least one transport network 230, at least one core network 240, and one or more servers 260. The device 100 (FIG. 1) may be incorporated in the UE 210 and/or the server 260.

The one or more UEs 210 may access the at least one core network 240 and/or IP services 250 via a connection to the one or more base stations 220 over a RAN domain 224 and through the at least one transport network 230. The one or more UEs 210 may further connect to the IP services 250 via a Wi-Fi connection or a wired connection. The one or more UEs 210 may upload information to the one or more servers 260 or download information from the one or more servers via the one or more base stations 220 or through a Wi-Fi or wired connection.

Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IOT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macrocells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. Alternatively or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

Figure 3:
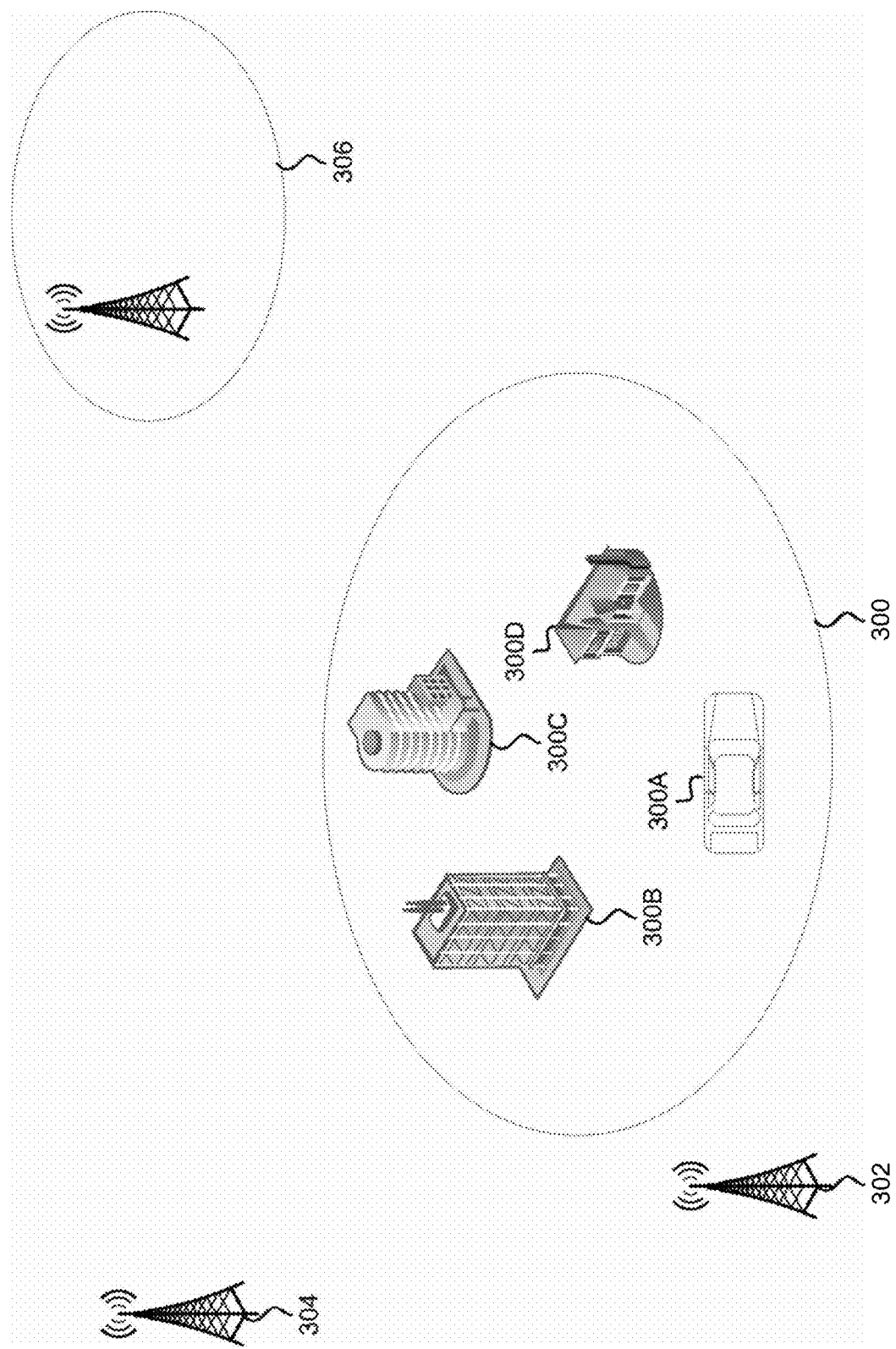
FIG. 3 illustrates an example planned network site, in accordance with various embodiments of the present disclosure.

FIG. 3 illustrates an example planned network site 300. The planned network site may be in the vicinity of one or more base stations 302 and 304, which may be similar to base station 220 (FIG. 2). The planned network site may also be in the vicinity of one or more competitor sites 306. The planned network site may be associated with one or more vehicles 300A to indicate the availability of incar (e.g., vehicle mobility) coverage. The planned network site may be associated with one or more buildings 300B—300D. The presence of the buildings 300B-300D may be used to determine a population density of the planned network site.

Figure 4:
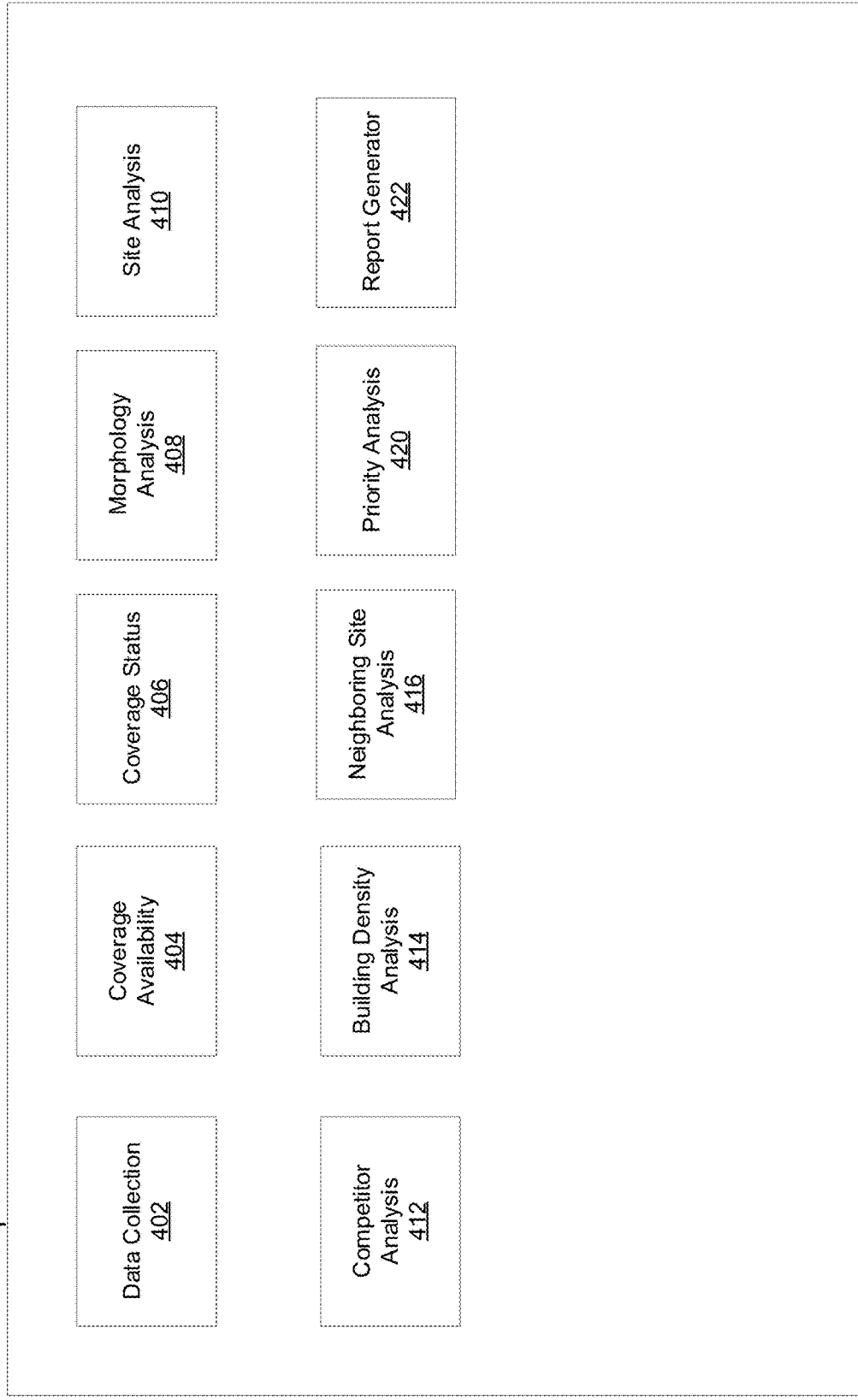
FIG. 4 illustrates example microservices, in accordance with various embodiments of the present disclosure.

FIG. 4 illustrates an example system 400 that includes one or more microservices for implementing the embodiments of the present disclosure. The system 400 may be implemented in server 260, where the UE 210 may utilize the microservices.

In some embodiments, the system 400 may include a data collection microservice 402. The data collection microservice may prepare a dataset of planned sites such as the planned network site 300. The data collection microservice may prepare the dataset with the planned sites having a predetermined age (e.g., pull proposed sites having an age greater than six months).

In some embodiments, the system 400 may include a coverage availability microservice 404. The coverage availability microservice 404 may determine the types of network coverage available for planned network sites. The types of network coverage may include, but are not limited to, outdoor coverage, incar coverage (e.g., vehicle mobility), and an indoor coverage.

In some embodiments, the system 400 may include a coverage status microservice 406. The coverage status microservice 406 may determine whether the planned network site is in a poor coverage polygon. For example, the coverage status microservice 406 may indicate a coverage hole or service gap where there is no or poor network service, thereby increasing the need and priority for a network site. The terms "coverage hole," "service gap," and "service gap polygon" may be used interchangeably, and may refer to a polygon generated over a smart network coverage layer, which shows a polygonal area of a poor coverage zone in the network. The systems, methods and devices may generate service gap polygons for each band periodically and provide optimization suggestions to improve the coverage, while further improving the tracking of the service gaps.

When identifying service gaps or coverage holes, the system may utilize various inputs. One input may include a unified coverage layer. A unified coverage layer may be a smart layer generated by superimposing planning prediction data and live test data, and collecting samples from users. An updated band-wise unified coverage layer may be present. Another input may include a site database. The site database may store information for all sites in the network, including information on a latitude, a longitude, an azimuth, band details, on air status, on air date, base station (e.g., eNB) identifier (ID), an evolved universal terrestrial access network (E-UTRAN) cell global identifier (ECGI), antenna height, electrical tilt, mechanical tilt, transmission power, reference signal receive power (RSRP), etc.

Other inputs may include clutter data, which includes information on area morphology (i.e., density of users or accesses), boundaries, which may include radio frequency (RF) cluster and region boundaries, a best server plot, which predicts coverage of a site calculated during a planning phase (e.g., generated from a prediction tool for on air sites), geo-location data, which may be collected using drive test tools such as net velocity, and may be passively collected data that has been used for a predetermined amount of time (e.g., 7 days), cell-wise preventative measurement (PM) counter key performance indicators (KPIs) such as call drop rate, radio resource control (RRC) attempts, RRC re-establishment attempts, mean control quality indicator (CQI), etc. Example embodiments of identifying a service gap or poor coverage polygon is disclosed in PCT/US2022/032939, filed on Jun. 10, 2022, the entire contents of which are incorporated herein by reference.

In some embodiments, the system 400 may include a morphology analysis microservice 408. The morphology analysis microservice 408 may determine a density of a planned network site to determine whether the planned network site is an urban area or a remote area. As an example, the morphology analysis microservice 408 may determine a population density within a predetermined radius of a planned network site to determine whether the planned network site is an urban rea or a remote area. The predetermined radius may be 200 meters. A planned network site that is determined to be an urban area may have a higher priority than a planned network site that is determined to be a remote area.

In some embodiments, the system 400 may include a site analysis microservice 410. The site analysis microservice 410 may calculate a distance between a serving site and a planned network site. The site analysis microservice 410 may also calculate a distance between the nearest site and the planned site. For example, referring to FIG. 3, the site having station 302 may be closer to planned network site 300 than the site having station 304 (e.g., site having station 302 is the nearest site). However, the site having station 302 may not be the serving site. For example, the site having station 302 may not have an antenna that faces the planned network site 300. In another example, the site having station 302 may have an antenna with a height of 17 meters, whereas the site having station 304 may have an antenna with a height of 30 meters. In these two examples, the site having station 304 may be the serving site instead of the site having station 302 even though the site having station 302 is the nearest site. If the nearest site and serving site are different from each other, the issues regarding why the nearest site is not able to serve the planned network site area may be analyzed. If by optimization of the nearest site, the planned network site area may be served by the nearest site, then a new planned site may not be deployed. If the nearest site cannot serve the planned network site area even by optimization, then the planned network site may be deployed based on the priority determined by the embodiments of the present disclosure.

In some embodiments, the system 400 may include a competitor analysis microservice 412. The competitor analysis microservice 412 may determine the number of competitor sites within a predetermined radius of a planned network site. The predetermined radius may be 200 m. A planned network site having a higher number of competitor sites than another planned network site may have a higher priority since a higher number of competitor network sites may indicate the availability of more network customers, and therefore higher potential revenue.

In some embodiments, the system 400 may include a building density microservice 414. The building density microservice 414 may determine a total number of buildings within a predetermined radius of a planned network site. The predetermined radius may be 200 m. A planned network site having a higher number of buildings within the predetermined radius than another planned network site may have a higher priority since the higher number of buildings may indicate the availability of more network customers, and therefore higher potential revenue.

In some embodiments, the system 400 may include a neighboring site analysis microservice 416. The neighboring site analysis microservice 416 may create a buffer for a planned network site and divide a 360 degree area surrounding the planned network site into a predetermined number of cones. For example, the 360 degree area may be divided into six 60 degree cones. As another example, the 360 degree area may be divided into three 120 degree cones. Each cone may be divided into a three sector cell, where each cell is categorized into a different band indicating network congestion. For example, each cell of a cone may be categorized into one of critical congestion, high utilization, and low utilization.

In each cone, the microservice 416 may find the immediate neighbor site and determine a distance between the planned network site and the immediate neighbor site. In each cone, the microservice 416 may further determine if the immediate neighbor site cell faces toward the planned network site (e.g., does the neighbor site have an antenna with an azimuth facing the planned network site). The microservice 416 may further determine a congestion status (e.g., critical congestion, high utilization, low utilization) of each sector of a cell. If it is determined that a neighbor site cell does not face toward the planned network site, the congestion status may be blank for each neighbor site cell.

In some embodiments, the system 400 may include a priority analysis microservice 418. The priority analysis microservice 418 may assign a priority level for each planned network site based on the information obtained from the other microservices included in the system 400. The assignment of the priority levels is disclosed in further detail with respect to FIGS. 5 and 7.

In some embodiments, the system 400 may include a report generator microservice 420. The report generator microservice may generate a report for each planned network site based on information obtained from the other microservices included in the system 400. An example report is provided in Table 1.

Figure 5:
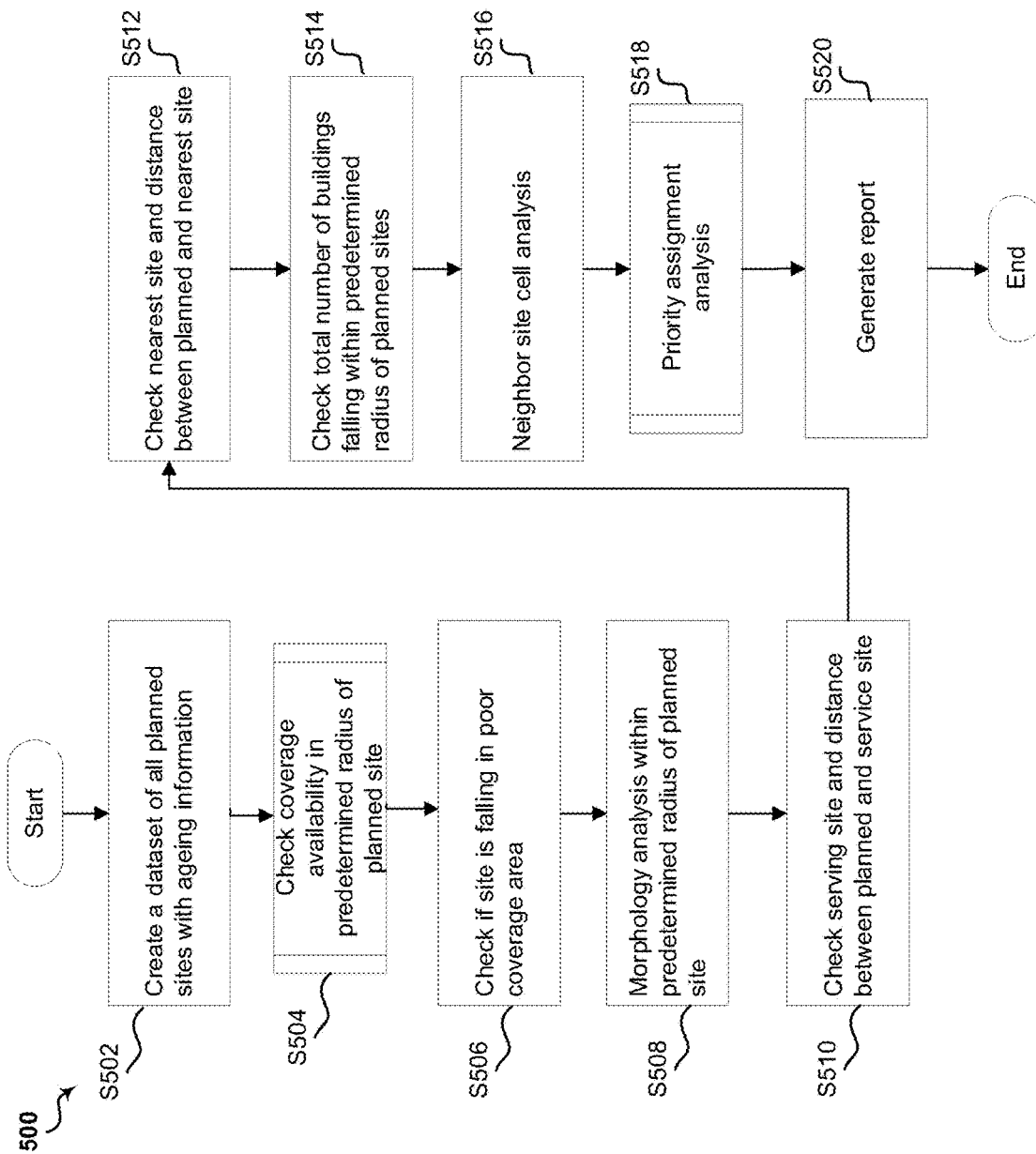
FIG. 5 illustrates a flow chart of an embodiment of a process for auto prioritization of planned network sites, in accordance with various embodiments of the present disclosure.

FIG. 5 illustrates an example flowchart of an embodiment of a process 500 for auto prioritization of planned network sites. The process may be performed by device 100 (FIG. 1). The process may generally start at step S502 where a dataset of all planned network sites with ageing information is created. For example, the process may utilize the data collection microservice 402 (FIG. 4) to create a dataset for planned network sites having an age of 6 months or greater. The remaining steps in FIG. 5 may be performed for each planned network site.

Figure 6:
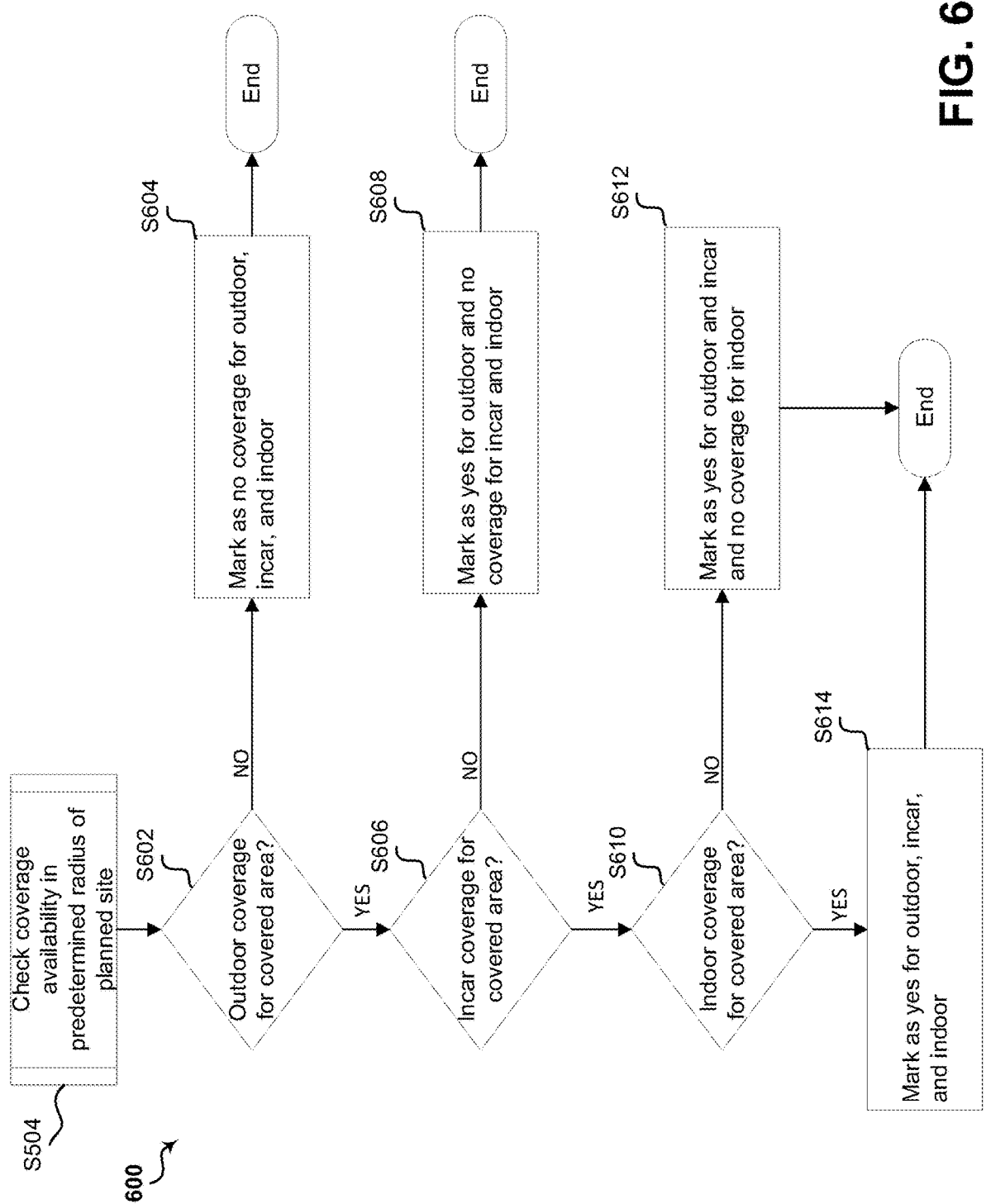
FIG. 6 illustrates a flow chart of an embodiment of a process for determining coverage availability, in accordance with various embodiments of the present disclosure.

The process proceeds to step S504 where coverage availability in a predetermined radius of a planned network site is checked. The process may use the coverage availability microservice 504 to perform the coverage availability step. FIG. 6 illustrates a flow chart of an embodiment of a process for performing the coverage availability check at step S504. The process 600 may start at step 602 to determine whether outdoor coverage for a covered area of a corresponding planned network site is available. As an example, the covered area of the corresponding planned network site may be determined to have outdoor coverage if 90% of the covered area has a reference signal received power (RSRP) greater than −115 dBm. If the covered area is determined not to have outdoor coverage, the process proceeds to step S604 where for the covered area for the planned network site is marked as no coverage for outdoor, incar, and indoor coverage.

If the covered area is determined to have outdoor coverage, the process proceeds from step S604 to step S606 where it is determined whether incar coverage for the covered area for the corresponding planned network site is available. As an example, the covered area of the corresponding planned network site may be determined to have incar coverage if 90% of the covered area has a RSRP greater than −105 dBm. If the covered area is determined not to have incar coverage, the process proceeds to step S608 where the covered area for the corresponding planned network site is marked yes for outdoor coverage and no coverage for incar and indoor coverage.

If the covered area is determined to have incar coverage, the process proceeds to step S610 where it is determined whether indoor coverage for the covered area of the corresponding planned network site is available. As an example, the covered area of the corresponding planned network may be determined to have indoor coverage if 90% of the covered area has a RSRP greater than −95 dBm. If the covered area is determined not to have indoor coverage, the process proceeds to step S612 where the covered area for the corresponding planned network site is marked yes for outdoor and incar coverage and no coverage for indoor coverage. If the covered area is determined to have indoor coverage, the process proceeds from step S610 to step S614 where the covered area for the corresponding planned network site is marked yes for outdoor, incar, and indoor coverage.

Returning to FIG. 5, the process proceeds from step S504 to step S506 were if it is determined whether a planned network site is falling in a poor coverage area. As an example, the process 500 may use the coverage status microservice 406 to determine whether the planned network site is falling in a poor coverage area.

The process proceeds to step S508 to perform morphology analysis within a predetermined radius of a planned network site. As an example, the process 500 may use the morphology analysis microservice 408 to perform a morphology analysis within a predetermined radius (e.g., 200 m) of a planned network site. For example, the morphology analysis, based on a determination of a population density within the predetermined radius, may mark the planned network as one of dense urban, urban, sub urban, and rural. The planned network site may be divided into a plurality of cells, where the cell with the dominant morphology is used as the morphology for the planned network site. For example, if one cell is marked as dense urban, and all other cells are marked as urban, the cell marked as dense urban may be identified as the dominant morphology and used as the morphology for the entire planned network site.

The process proceeds to step S510 to check the serving site and a distance between the planned network site and the serving site. The process proceeds to step S512 to check the nearest site and a distance between the planned network site and the nearest site.

The process proceeds to step S514 to determine the total number of buildings falling within a predetermined radius of the planned network site. For example, the process 500 may use the building density analysis microservice 414 to determine a total number of buildings within a predetermined radius (e.g., 200 m) of a planned network site. The process proceeds to step S516 to perform a neighbor site cell analysis. For example, the process 500 may use the neighboring site analysis microservice 416 to perform neighboring site analysis.

The process proceeds to step S518 to perform priority assignment analysis. As an example, the process may use the priority analysis microservice 420 to perform the priority assignment analysis. FIG. 7 illustrates a flow chart of an embodiment of a process 700 for performing the priority analysis at step S518. The process 700 may start at step S702 where a planned network site is assigned a priority level P1 if any of the neighbors facing a sector's cell is tagged as under "critically congested cell." For example, if a sector of a cell has an available bandwidth of <X kbps, the cell may be marked as "critically congested cell." As an example, the parameter X kbps may be configurable and set by default to 2 mbps (1024 kbps).

The process proceeds to step S704 where a planned network site is assigned a priority level P2 if the planned network site has at least one neighboring cell in which all sectors of the neighboring cell are marked as high utilization. The process proceeds to step S706 where a planned network site is assigned a priority level P3 if the planned network site has at least one neighboring cell in which a majority of the sectors of the neighboring cell (e.g., 2 out of 3) are marked as high utilization. The process proceeds to step S708 where a planned network site is assigned a priority level P4 if one sector of at least one neighboring cell (e.g., 1 out 3) is marked as high utilization. The assignment of priority levels P1-P4 may be based on the neighbor site cell analysis performed in step S518 (FIG. 5). As understood by one of ordinary skill in the art, a planned network site may be assigned one of priority values P1, P2, P3, and P4.

The process proceeds to step S710 where a planned network site is assigned priority level P5 if a the planned network site is marked as yes for poor coverage polygon status (e.g., coverage hole) based on at least the analysis performed in steps S504 and S506 (FIG. 5). The process proceeds to step S712 where a planned network site is assigned priority level P6 if a total building count is greater than or equal to a threshold (e.g., 20). The total building count may be based on at least on the analysis performed in step S514 (FIG. 5). The process proceeds to step S714 where a planned network site is assigned priority level P7 if a competitor site count within a predetermined radius (e.g., 20 m) is greater than or equal to a threshold (e.g., 1). The competitor site count may be based at least on the analysis performed in step S516. The process proceeds to step S716 where planned network sites not assigned a priority level P1-P7 are assigned a priority level P8. In the priority analysis step, the priority level P1 may be the highest priority, and the priority level P8 may be the lowest priority.

Returning to FIG. 5, the process proceeds from step S518 to step S520 where a report is generated. As an example, the report generator microservice 422 may be used to generate the report. Table 1 illustrates an example generated report.

TABLE 1

| | Column Name | | Business Logic/Rules |
|---|---|---|---|
| | Planned Site | | Id of the Planned site |
| | Lattitude | | Latitude of the respective planned site |
| | Longitude | | Longitude of the planned site |
| Site Status | 2300 Mhz | Status | Site Status from the respective Band |
| | | Ageing (Days) | Age of Site Status in Days (Date of report generation – Date of closure) |
| | 1800 Mhz | Status | Site Status from the respective Band |
| | | Ageing (Days) | Age of Site Status in Days (Date of report generation – Date of closure) |
| | 850 Mhz | Status | Site Status from the respective Band |
| | | Ageing (Days) | Age of Site Status in Days (Date of report generation – Date of closure) |
| Coverage Level | Indoor Coverage (covered area >= 90% at RSRP >= −95 dBm) | | Area (%) covered of respective village at RSRP >= −95 dBm for the 200*200 m square region/polygon around the planned site point taken as centroid. If area is >=90% field should be marked with "Yes" otherwise "No" |
| | In-car Coverage (covered area >= 90% at RSRP >= −105 dBm) | | Area (%) covered of respective village at RSRP >= −105 dBm for the 200*200 m square region/polygon around the planned site point taken as centroid. If area is >=90% field should be marked with "Yes" otherwise "No" |
| | Outdoor Coverage (covered area >= 90% at RSRP >= −115 dBm) | | Area (%) covered of respective village at RSRP >= −115 dBm for the 200*200 m square region/polygon around the planned site point taken as centroid. If area is >=90% field should be marked with "Yes" otherwise "No" |
| | RSRP Value (dBm) | | Absolute value of RSRP in dBm at the location of the planned site |
| | Poor Coverage Polygon Status | | If planned site is falling within 100 m buffer of the Poor Coverage Polygon put "Yes" otherwise "No" |
| | Morphology | | Maximum area of the morphology falling in 200*200 m grid of the user input. |
| | Serving Site Id | | Site Id which is providing coverage at that location, if coverage is <−120 dBm then column will be blank |
| | Serving Sector Id | | Sector Id (cnum) which is providing coverage at that location, if coverage is <−120 dBm then column will be blank |
| | Distance from Serving Site Id (km) | | Distance in km. between serving site and respective Planned site |
| | Nearest Site Id | | Nearest Site ID for the respective Planned site |
| | Nearest Site Category | | Site category of the nearest site whether its On-air or Planned |
| | Distance from Nearest Site Id (km) | | Distance in km. between nearest site and respective Planned site |
| | Nearest Planned Id | | Nearest Ref. Id from the Planned site excluding one for which query is being generated |
| | Distance from Nearest Planned Id | | Distance in km. between nearest ref id and respective Planned site |
| Nearest Competitor Details | Total site count within 200 m | | Competitor site count within 200 m of planned site |
| | Competitor 1 | Operator Name | Name of the nearest competitor from the Planned site |
| | | Site Id | Site Id of the competitor1 site |
| | | Distance (km) between competitor & Planned Site | Distance in km. between comp1 site and respective Planned site |
| | Competitor 2 | Operator Name | Name of the nearest competitor from the Planned site excluding competitor1 (For example: - if 1st competitor was airtel then now it will search in rest of competitors) |

TABLE 1-continued

| | Column Name | | Business Logic/Rules |
|---|---|---|---|
| | | Site Id | Site Id of the competitor2 site |
| | | Distance (km) between competitor & Planned Site | Distance in km. between comp2 site and respective Planned site |
| | Competitor 3 | Operator Name | Name of the nearest competitor from the Planned site excluding competitor1 & competitor2 (For example: - if 1st competitor was airtel and 2nd was Vodafone then now it will search in rest of competitors) |
| | | Site Id | Site Id of the competitor3 site |
| | | Distance (km) between competitor & Planned Site | Distance in km. between comp3 site and respective Planned site |
| | Total Buildings | | Total no of Buildings falling in 200 m buffer of Planned site |
| Nearest radiating Site(s)/Cell(s) (Neighbor as per geography) | Neighbor1 (0 to 60deg) | Site ID | Nearest Site ID falling within the arc of 0 to 60deg |
| | | Distance (km) Between Planned site & Nearest SAP Id | Distance(km) Between Planned site & Nearest SAP Id using distance calculation between two geo-coordinates. Search ring will be up to 3 km only. |
| | | Azimuth Facing (Yes/No) | If azimuth of Neighbor site falls within ±60deg of bearing angle (Neighbor radiating site to Planned Site) |
| | | Sector (α/β/γ) | Sector of SAP Id which facing towards respective planned site. It will be blank if Azimuth facing is "No". |
| | | High Utilized Bands (count) | Count of band which are tagged as high utilized for the respective sector (α/β/γ) (Note: - It should be in sync with capacity report). Example: - if 1 band out of 3 is highly utilized then field will be having value as 1 out of 3. . It will be blank if Azimuth facing is "No". |
| | Neighbor2 (61 to 120deg) | Site ID | Nearest Site ID falling within the arc of 61 to 120deg |
| | | Distance (km) Between Planned site & Nearest SAP Id | Distance(km) Between Planned site & Nearest SAP Id using distance calculation between two geo-coordinates. Search ring will be up to 3 km only. |
| | | Azimuth Facing (Yes/No) | If azimuth of Neighbour site falls within ±60deg of bearing angle (Neighbour radiating site to Planned Site) |
| | | Sector (α/β/γ) | Sector of SAP Id which facing towards respective planned site. It will be blank if Azimuth facing is "No". |
| | | High Utilized Bands (count) | Count of band which are tagged as high utilized for the respective sector (α/β/γ) (Note: - It should be in sync with capacity report). Example: - if 1 band out of 3 is highly utilized then field will be having value as 1 out of 3. It will be blank if Azimuth facing is "No". |
| | Neighbor3 (121 to 180deg) | Site ID | Nearest Site ID falling within the arc of 121 to 180deg |
| | | Distance (km) Between Planned site & Nearest SAP Id | Distance(km) Between Planned site & Nearest SAP Id using distance calculation between two geo-coordinates. Search ring will be up to 3 km only. |
| | | Azimuth Facing (Yes/No) | If azimuth of Neighbor site falls within ±60deg of bearing angle (Neighbor radiating site to Planned Site) |
| | | Sector (α/β/γ) | Sector of SAP Id which facing towards respective planned site. It will be blank if Azimuth facing is "No". |

TABLE 1-continued

| Column Name | | Business Logic/Rules |
|---|---|---|
| | High Utilized Bands (count) | Count of band which are tagged as high utilized for the respective sector ($\alpha/\beta/\gamma$) (Note: - It should be in sync with capacity report). Example: - if 1 band out of 3 is highly utilized then field will be having value as 1 out of 3. It will be blank if Azimuth facing is "No". |
| Neighbor4 (181 to 240deg) | Site ID | Nearest Site ID falling within the arc of 181 to 240deg |
| | Distance (km) Between Planned site & Nearest SAP Id | Distance(km) Between Planned site & Nearest SAP Id using distance calculation between two geo-coordinates. Search ring will be up to 3 km only. |
| | Azimuth Facing (Yes/No) | If azimuth of Neighbor site falls within ±60deg of bearing angle (Neighbor radiating site to Planned Site) |
| | Sector ($\alpha/\beta/\gamma$) | Sector of SAP Id which facing towards respective planned site. It will be blank if Azimuth facing is "No". |
| | High Utilized Bands (count) | Count of band which are tagged as high utilized for the respective sector ($\alpha/\beta/\gamma$) (Note: - It should be in sync with capacity report). Example: - if 1 band out of 3 is highly utilized then field will be having value as 1 out of 3. It will be blank if Azimuth facing is "No". |
| Neighbor5 (241 to 300deg) | Site ID | Nearest Site ID falling within the arc of 241 to 300deg |
| | Distance (km) Between Planned site & Nearest SAP Id | Distance(km) Between Planned site & Nearest SAP Id using distance calculation between two geo-coordinates. Search ring will be up to 3 km only. |
| | Azimuth Facing (Yes/No) | If azimuth of Neighbor site falls within ±60deg of bearing angle (Neighbor radiating site to Planned Site) |
| | Sector ($\alpha/\beta/\gamma$) | Sector of SAP Id which facing towards respective planned site. It will be blank if Azimuth facing is "No". |
| | High Utilized Bands (count) | Count of band which are tagged as high utilized for the respective sector ($\alpha/\beta/\gamma$) (Note: - It should be in sync with capacity report). Example: - if 1 band out of 3 is highly utilized then field will be having value as 1 out of 3. It will be blank if Azimuth facing is "No". |
| Neighbor6 (301 to 360deg) | Site ID | Nearest Site ID falling within the arc of 301 to 360deg |
| | Distance (km) Between Planned site & Nearest SAP Id | Distance(km) Between Planned site & Nearest SAP Id using distance calculation between two geo-coordinates. Search ring will be up to 3 km only. |
| | Azimuth Facing (Yes/No) | If azimuth of Neighbor site falls within ±60deg of bearing angle (Neighbor radiating site to Planned Site) |
| | Sector ($\alpha/\beta/\gamma$) | Sector of SAP Id which facing towards respective planned site. It will be blank if Azimuth facing is "No". |
| | High Utilized Bands (count) | Count of band which are tagged as high utilized for the respective sector ($\alpha/\beta/\gamma$) (Note: - It should be in sync with capacity report). Example: - if 1 band out of 3 is highly utilized then field will be having value as 1 out of 3. It will be blank if Azimuth facing is "No". |
| | Priority | P1 if any of the neighbor facing sector's cell is tagged under "Critically congested cells" category [if cell is having value < X kbps with class 3<br>P2 if Max of all columns "High Utilized Bands (count)" is 3 out of 3/2 out of 2/ 1 out of 1<br>P3 if Max of all columns "High Utilized Bands (count)" is 2 out of 3/1 out of 2<br>P4 if Max of all columns "High Utilized Bands (count)" is 1 out of 3 |

TABLE 1-continued

| Column Name | Business Logic/Rules |
|---|---|
| | P5 if Poor Coverage Polygon status is "Yes"<br>P6 if Total Building count is >=20<br>P7 if competitor site count within 200 m >=1<br>P8 for remaining |

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed in a processor for planning network sites, the method includes receiving a dataset of a plurality of planned network sites: executing a coverage availability microservice to determine coverage availability for each planned network site in the plurality of planned network sites: executing one or more microservices to determine geographic conditions for each planned network site in the plurality of network sites; executing a priority microservice to assign one or more priority levels to each planned network site of the plurality of planned network sites based on at least the determined coverage availability for each planned network site and the determined geographic conditions for each planned network site: and executing a report generating microservice to generate a report for each planned network site of the plurality of network sites, the report including at least the determined coverage availability, the determined geographic conditions, and the assigned one or more priority levels for each planned network site.

(2) The method of feature (1), in which each planned network site is associated with a date greater than a predetermined date threshold.

(3) The method of feature (1) or (2), in which the coverage availability specifies at least one of outdoor coverage, indoor coverage, and car mobility coverage.

(4) The method of feature (3), further including determining a coverage status of a corresponding planned network site based at least on the coverage availability of the corresponding planned network site, in which a priority level for the corresponding planned network site increases in response to a determination that the corresponding planned network site is in a poor coverage area.

(5) The method of any one of features (1)-(4), in which the one or more microservices to determine the geographic conditions includes a morphology analysis microservice that determines geographic conditions indicating a population density within a predetermined distance of a corresponding planned network site.

(6) The method of any one of features (1)-(5), in which the one or more microservices to determine the geographic conditions include a site analysis microservice that determines a distance between a serving site and a corresponding planned network site.

(7) The method of feature (6), in which the site analysis microservice further determines a distance between a nearest site and the corresponding planned network site, in which the nearest site is not the serving site in response to a determination that (i) the nearest site does not include an antenna facing the corresponding planned network site, or (ii) the serving site includes an antenna with a greater height than a height of the antenna of the nearest site.

(8) The method of any one of features (1)-(7), in which the one or more microservices to determine the geographic conditions includes a competitor analysis microservice that determines a total number of competitor sites within a predetermined of a correspond planned network site, in which an increase in the total number of competitor sites increases a priority level of the corresponding planned network site.

(9) The method of any one of features (1)-(8), in which the one or more microservices to determine the geographic conditions include building density analysis microservice that determines a total number of buildings within a predetermined distance of a corresponding planned network site, in which an increase in the total number of buildings increases a priority level of the corresponding planned network site.

(10) The method of any one of features (1)-(9), in which the one or more microservices to determine the geographic conditions include a neighboring site analysis microservice that determines a utilization status of one or more neighboring sites of a corresponding planned network site, in which an increase in a utilization status of the one or more neighboring sites increases a priority level of the corresponding planned network site.

(11) A device for planning network sites, the device includes: at least one memory configured to store computer program code: and at least one processor configured to access said at least one memory and operate as instructed by said computer program code, said computer program code including: receiving code configured to cause at least one of said at least one processor to receive a dataset of a plurality of planned network sites, first executing code configured to cause at least one of said at least one processor to execute a coverage availability microservice to determine coverage availability for each planned network site in the plurality of planned network sites, second executing code configured to cause at least one of said at least one processor to execute one or more microservices to determine geographic conditions for each planned network site in the plurality of network sites, third executing code configured to cause at least one of said at least one processor to execute a priority microservice to assign one or more priority levels to each planned network site of the plurality of planned network sites based on at least the determined coverage availability for each planned network site and the determined geographic conditions for each planned network site, and fourth executing code configured to cause at least one of said at least one processor to execute a report generating microservice to generate a report for each planned network site of the plurality of network sites, the report including at least the determined coverage availability, the determined geographic conditions, and the assigned one or more priority levels for each planned network site.

(12) The device of feature (11), in which each planned network site is associated with a date greater than a predetermined date threshold.

(13) The device of feature (11) or (12), in which the coverage availability specifies at least one of outdoor coverage, indoor coverage, and car mobility coverage.

(14) The device of feature (13), in which said computer program code further includes determining code configured to cause at least one of said at least one processor to determine a coverage status of a corresponding planned network site based at least on the coverage availability of the corresponding planned network site, in which a priority level for the corresponding planned network site increases in response to a determination that the corresponding planned network site is in a poor coverage area.

(15) The device according to any one of features (11)-(14), in which the one or more microservices to determine the geographic conditions includes a morphology analysis microservice that determines geographic conditions indicating a population density within a predetermined distance of a corresponding planned network site.

(16) The device according to any of features (11)-(15), in which the one or more microservices to determine the geographic conditions include a site analysis microservice that determines a distance between a serving site and a corresponding planned network site.

(17) The device of feature (16), in which the site analysis microservice further determines a distance between a nearest site and the corresponding planned network site, in which the nearest site is not the serving site in response to a determination that (i) the nearest site does not include an antenna facing the corresponding planned network site, or (ii) the serving site includes an antenna with a greater height than a height of the antenna of the nearest site.

(18) The device according to any one of features (11)-(17), in which the one or more microservices to determine the geographic conditions includes a competitor analysis microservice that determines a total number of competitor sites within a predetermined of a correspond planned network site, in which an increase in the total number of competitor sites increases a priority level of the corresponding planned network site.

(19) The device according to any one of features (11)-(18), in which the one or more microservices to determine the geographic conditions include building density analysis microservice that determines a total number of buildings within a predetermined distance of a corresponding planned network site, in which an increase in the total number of buildings increases a priority level of the corresponding planned network site.

(20) A non-transitory computer readable medium having instructions stored therein, which when executed by a processor cause the processor to execute a method for planning network sites, the method including receiving a dataset of a plurality of planned network sites; executing a coverage availability microservice to determine coverage availability for each planned network site in the plurality of planned network sites; executing one or more microservices to determine geographic conditions for each planned network site in the plurality of network sites; executing a priority microservice to assign one or more priority levels to each planned network site of the plurality of planned network sites based on at least the determined coverage availability for each planned network site and the determined geographic conditions for each planned network site; and executing a report generating microservice to generate a report for each planned network site of the plurality of network sites, the report including at least the determined coverage availability, the determined geographic conditions, and the assigned one or more priority levels for each planned network site.

What is claimed is:

1. A method performed in a processor for planning network sites, the method comprising:
  receiving a dataset of a plurality of planned network sites;
  executing a coverage availability microservice to determine coverage availability for each planned network site in the plurality of planned network sites;
  executing one or more microservices to determine geographic conditions for each planned network site in the plurality of network sites;
  executing a priority microservice to assign one or more priority levels to each planned network site of the plurality of planned network sites based on at least the determined coverage availability for each planned network site and the determined geographic conditions for each planned network site; and
  executing a report generating microservice to generate a report for each planned network site of the plurality of network sites, the report including at least the determined coverage availability, the determined geographic conditions, and the assigned one or more priority levels for each planned network site.

2. The method of claim 1, wherein each planned network site is associated with an age greater than a predetermined age threshold.

3. The method of claim 1, wherein the coverage availability specifies at least one of outdoor coverage, indoor coverage, and car mobility coverage.

4. The method of claim 3, further comprising determining a coverage status of a corresponding planned network site based at least on the coverage availability of the corresponding planned network site, wherein a priority level for the corresponding planned network site increases in response to a determination that the corresponding planned network site is in a poor coverage area.

5. The method of claim 1, wherein the one or more microservices to determine the geographic conditions includes a morphology analysis microservice that determines geographic conditions indicating a population density within a predetermined distance of a corresponding planned network site.

6. The method of claim 1, wherein the one or more microservices to determine the geographic conditions include a site analysis microservice that determines a distance between a serving site and a corresponding planned network site.

7. The method of claim 6, wherein the site analysis microservice further determines a distance between a nearest site and the corresponding planned network site, wherein the nearest site is not the serving site in response to a determination that (i) the nearest site does not include an antenna facing the corresponding planned network site, or (ii) the serving site includes an antenna with a greater height than a height of the antenna of the nearest site.

8. The method of claim 1, wherein the one or more microservices to determine the geographic conditions includes a competitor analysis microservice that determines a total number of competitor sites within a predetermined of a correspond planned network site, wherein an increase in the total number of competitor sites increases a priority level of the corresponding planned network site.

9. The method of claim 1, wherein the one or more microservices to determine the geographic conditions include building density analysis microservice that determines a total number of buildings within a predetermined distance of a corresponding planned network site, wherein an increase in the total number of buildings increases a priority level of the corresponding planned network site.

10. The method of claim 1, wherein the one or more microservices to determine the geographic conditions include a neighboring site analysis microservice that determines a utilization status of one or more neighboring sites of a corresponding planned network site, wherein an increase in a utilization status of the one or more neighboring sites increases a priority level of the corresponding planned network site.

11. A device for planning network sites, the device comprising:
    at least one memory configured to store computer program code; and
    at least one processor configured to access said at least one memory and operate as instructed by said computer program code, said computer program code including:
        receiving code configured to cause at least one of said at least one processor to receive a dataset of a plurality of planned network sites,
        first executing code configured to cause at least one of said at least one processor to execute a coverage availability microservice to determine coverage availability for each planned network site in the plurality of planned network sites,
        second executing code configured to cause at least one of said at least one processor to execute one or more microservices to determine geographic conditions for each planned network site in the plurality of network sites,
        third executing code configured to cause at least one of said at least one processor to execute a priority microservice to assign one or more priority levels to each planned network site of the plurality of planned network sites based on at least the determined coverage availability for each planned network site and the determined geographic conditions for each planned network site, and
        fourth executing code configured to cause at least one of said at least one processor to execute a report generating microservice to generate a report for each planned network site of the plurality of network sites, the report including at least the determined coverage availability, the determined geographic conditions, and the assigned one or more priority levels for each planned network site.

12. The device of claim 11, wherein each planned network site is associated with an age greater than a predetermined age threshold.

13. The device of claim 11, wherein the coverage availability specifies at least one of outdoor coverage, indoor coverage, and car mobility coverage.

14. The device of claim 13, wherein said computer program code further includes determining code configured to cause at least one of said at least one processor to determine a coverage status of a corresponding planned network site based at least on the coverage availability of the corresponding planned network site, wherein a priority level for the corresponding planned network site increases in response to a determination that the corresponding planned network site is in a poor coverage area.

15. The device of claim 11, wherein the one or more microservices to determine the geographic conditions includes a morphology analysis microservice that determines geographic conditions indicating a population density within a predetermined distance of a corresponding planned network site.

16. The device of claim 11, wherein the one or more microservices to determine the geographic conditions include a site analysis microservice that determines a distance between a serving site and a corresponding planned network site.

17. The device of claim 16, wherein the site analysis microservice further determines a distance between a nearest site and the corresponding planned network site, wherein the nearest site is not the serving site in response to a determination that (i) the nearest site does not include an antenna facing the corresponding planned network site, or (ii) the serving site includes an antenna with a greater height than a height of the antenna of the nearest site.

18. The device of claim 11, wherein the one or more microservices to determine the geographic conditions includes a competitor analysis microservice that determines a total number of competitor sites within a predetermined of a correspond planned network site, wherein an increase in the total number of competitor sites increases a priority level of the corresponding planned network site.

19. The device of claim 11, wherein the one or more microservices to determine the geographic conditions include building density analysis microservice that determines a total number of buildings within a predetermined distance of a corresponding planned network site, wherein an increase in the total number of buildings increases a priority level of the corresponding planned network site.

20. A non-transitory computer readable medium having instructions stored therein, which when executed by a processor cause the processor to execute a method for planning network sites, the method comprising:
    receiving a dataset of a plurality of planned network sites;
    executing a coverage availability microservice to determine coverage availability for each planned network site in the plurality of planned network sites;
    executing one or more microservices to determine geographic conditions for each planned network site in the plurality of network sites;
    executing a priority microservice to assign one or more priority levels to each planned network site of the plurality of planned network sites based on at least the determined coverage availability for each planned network site and the determined geographic conditions for each planned network site; and
    executing a report generating microservice to generate a report for each planned network site of the plurality of network sites, the report including at least the determined coverage availability, the determined geographic conditions, and the assigned one or more priority levels for each planned network site.

* * * * *